(12) United States Patent
Partain et al.

(10) Patent No.: US 7,068,607 B2
(45) Date of Patent: Jun. 27, 2006

(54) BANDWIDTH BROKER FOR CELLULAR RADIO ACCESS NETWORKS

(75) Inventors: David Partain, Linköping (SE); Bo Stefan Pontus Wallentin, Ljungsbro (SE)

(73) Assignee: Telefonktiebolaget LM Ericsson (publ), Stockholm (SE)

( * ) Notice: Subject to any disclaimer, the term of this patent is extended or adjusted under 35 U.S.C. 154(b) by 713 days.

(21) Appl. No.: 09/941,878

(22) Filed: Aug. 29, 2001

(65) Prior Publication Data

US 2002/0181394 A1 Dec. 5, 2002

Related U.S. Application Data (60) Provisional application No. 60/229,056, filed on Aug. 31, 2000.

(51) Int. Cl.
*G01R 31/08* (2006.01)

(52) U.S. Cl. .................. 370/241; 370/401
(58) Field of Classification Search ........ 370/231–235, 370/229, 230, 236.1, 236.2, 401, 468; 709/225, 709/226, 229, 235
See application file for complete search history.

(56) References Cited

U.S. PATENT DOCUMENTS 6,216,006 B1 * 4/2001 Scholefield et al. ........ 455/450
6,404,738 B1 * 6/2002 Reininger et al. .......... 370/236
6,647,412 B1 * 11/2003 Strandberg et al. ........ 370/241
2001/0027490 A1 * 10/2001 Fodor et al. ............... 709/238
2001/0032262 A1 * 10/2001 Sundqvist et al. ......... 709/226

FOREIGN PATENT DOCUMENTS

EP    1 026 855 A2   8/2000
WO    00/49824 A1    8/2000

OTHER PUBLICATIONS

T. Aimoto, et al., "Overview of DiffServ Technology: It's Mechanism and Implementation", IEICE Trans. Inf. & Syst., vol. E83-D, No. 5, May 2000.

L. Westberg, et al., "A Two-bit Resource Allocation Scheme," Internet Engineering Task Force (IETF), Apr. 2000, http://www.ietf.org/letf/lid-abstracts/txt.

(Continued)

Primary Examiner—Duc Ho
Assistant Examiner—Phuongchau Ba Nguyen (57) ABSTRACT

An architecture for resource management of an IP-based cellular radio access network is presented. A measurement-based admission control scheme is used to monitor the load for each path in the network and QoS (quality of service) class and resource decisions are made based upon that information. A bandwidth broker is introduced in the cellular radio access network (RAN). The bandwidth broker processes the on-demand admission requests for IP resources by using the results of load control measurements. Since the requests can be processed very quickly using a simple table look-up, response times are fast, and the architecture is thus suitable for the cellular environment.

15 Claims, 8 Drawing Sheets

OTHER PUBLICATIONS

K. Nichols, et al., "A Two-bit Differentiated Services Architecture for the Internet", Internet Engineering Task Force (IETF), The Internet Society, Jul. 1999.

V. Jacobson, et al., "An Expedited Forwarding PHB", Internet Engineering Task Force (IETF) RFC 2598, The Internet Society, Jun. 1999.

J. Heinanen, et al., "Assured Forwarding PHB Group", Internet Engineering Task Force (IETF) RFC 2597, The Internet Society, Jun. 1999.

K. Nichols, et al., "Definition of the Differentiated Services Field (DS Field) in the IPv4 and IPv6 Headers", Internet Engineering Task Force (IETF) RFC 2474, The Internet Society, Dec. 1998.

R. Braden, et al., "Resource ReSerVation Protocol (RSVP)—Version 1 Functional Specification", Internet Engineering Task Force (IETF) RFC 2205, The Internet Society, Sep. 1997.

* cited by examiner

BANDWIDTH BROKER FOR CELLULAR RADIO ACCESS NETWORKS

CROSS-REFERENCE TO RELATED APPLICATION

This application claims the benefit of U.S. Provisional Patent Application No. 60/229,056, filed Aug. 31, 2000.

BACKGROUND

This invention generally relates to access control to a network. More particularly, the present invention provides a mechanism for controlling access to a radio network based upon the current loading of the network.

A fundamental principle in the design of mobile wireless systems is that the radio spectrum is the scarcest resource. Accordingly, the network should be dimensioned in such a way that resources within the network are always available. In second-generation systems, such as Global System for Mobile Communication (GSM), which are typically optimized for speech-like services, network dimensioning to provide available resources is simple to achieve when the transport is based on STM (Synchronous Transport Mechanism) circuits. For each radio channel, a timeslot is assigned on the STM circuit to match the bit rate of the radio channel. The quality of service (QoS) can be guaranteed, but statistical multiplexing can not be used to save transport resources. This limitation on the use of statistical multiplexing is not a significant problem when the variance in bit rate is moderate, as it is in the case when speech is the dominating service.

When introducing packet switched services, where data rates vary in a greater span (for example, up to 384 kbps), a packet switched transport network is introduced to efficiently handle the variable bit rate services as well as speech. However, to dimension a packet switched transport network and still maintain the principle that the radio spectrum is the scarcest resource is not an easy task. The transmission links to the base station sites are often expensive, so over-provisioning is not necessarily the best option, especially if bandwidth can be saved by introducing some degree of resource control. Introducing QoS requirements on user connections, as opposed to best effort, makes dimensioning even harder. Admission control is needed when there are no transport resources available. After all, it is better to give a busy tone than to establish the call with a bad quality, since the user pays to get an expected quality of service.

As such, it is essential that we have a simple and scalable resource management scheme for realtime traffic in a packet switched network. In order for real-time services, such as voice, to function satisfactorily in an IP-based radio access network (RAN), for example, there need to be adequate transport resources in the RAN to handle the particular instance of that service (e.g., a phone call).

The Differentiated Services (DiffServ) working group of the Internet Engineering Task Force (IETF) has established scalable QoS mechanisms, commonly known as Differentiated Services, which have now been implemented by various router vendors. DiffServ is defined by IETF RFC 2474, and it is expected that DiffServ will be the primary mechanism for implementing QoS mechanisms in IP-based networks.

An IP network that includes DiffServ functionality is called the DS domain and consists of boundary nodes and interior nodes. The boundary nodes typically have full QoS functions, while the interior nodes have limited QoS functions. Full QoS functionality includes packet classification, during which each incoming packet is classified into a DiffServ Codepoint (DSCP) that is marked in the IP header. Full QoS functionality also includes the policing and shaping of the incoming packets, so that the bandwidth of each QoS class (or DSCP) may be kept within configured bounds.

The interior router forwards packets according to the Per-Hop Behavior (PHB) that the given DSCP value is mapped to. By using several different Per-Hop Behaviors in an interior router, QoS differentiation is provided. Examples of Per-Hop Behaviors specified by IETF are Assured Forwarding (AF) (RFC 2597) and Expedited Forwarding (EF) (RFC 2598).

Figure 1:
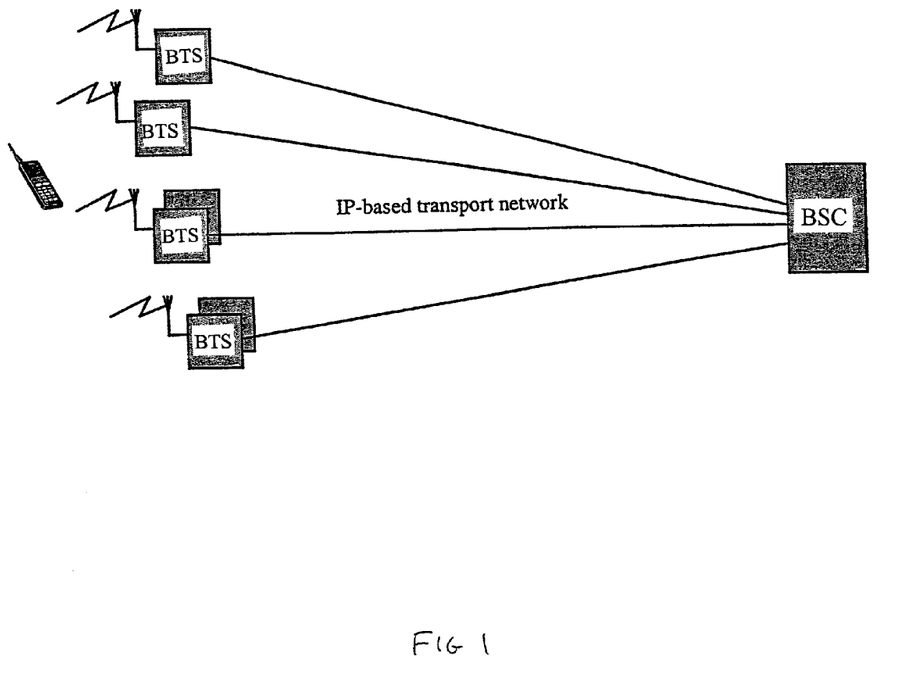
FIG. 1 is a block diagram of a GSM Radio Access Network.

As an example of a cellular radio access network, we describe the RAN for Global System for Mobile Communication (GSM). The GSM RAN includes a number of different kinds of nodes, some of which are illustrated in FIG. 1.

The BTS (Base Transceiver Station or "base station") includes the RF (Radio Frequency) functionality and terminates the IP tunneling layer. The area covered by one BTS is defined as a cell. Several BTSs can be co-located, sharing the same antenna on the same base station site. The transport between the BTS and BSC (Base Station Controller) carries primarily airframes, which are tunneled through the IP network. These networks are large both in terms of the number of nodes as well as the geographic size. Many thousands of BTSs and BSCs could potentially be interconnected.

The transport from the BTS to the BSC is the part of the network that is most sensitive to delays and has the highest volume of real-time traffic. In some configurations, the amount of real-time traffic corresponds to the amount of voice traffic, and the network must ensure appropriate QoS for approximately 90% voice traffic.

The traffic volume for voice carried in the network can vary from a few calls up to fifty voice calls per BTS, and up to several thousand simultaneous calls (Erlang) per BSC site. In this case, several BSCs may be co-located at the same site.

The transmission between BTSs (due to the wide area coverage of the cellular network) and the BSC is often on leased lines, which may be very expensive when compared to the cost of transmission in the backbone. Even if the cost for leased lines decreases over the years, the "last mile" to the BTS is likely to continue to be expensive when the BTS is located remotely (e.g., on a mountaintop). Dimensioning using over-provisioning might therefore be prohibitively expensive. As such, mechanisms that can be used to optimize the utilization of available bandwidth in these expensive links is very important. Dynamic allocation of resources and optimization of bandwidth to reduce the cost is, therefore, an important feature.

In addition to traffic volume, mobility can significantly impact network resources. Handover (or handoff) is the process, generated by mobility, of establishing a radio link in a MC new cell and releasing the radio link in the old cell. In the GSM context, mobility usually generates handover for voice traffic an average of one to two times per call. For third generation networks, such as WCDMA and cdma2000, where it is necessary to keep radio links to several cells simultaneously to provide macrodiversity, the handover rate is typically much higher. Therefore, because of the handover rate, the admission control process has to cope with far more admission requests than call setups alone would generate.

Handover can also result in packet loss. If the processing of an admission request causes a delayed handover to the new BTS, some packets might be discarded, and the overall speech quality might be degraded significantly. Also, a delay in handover may cause degradation for other users. This is especially true for systems using macrodiversity and frequency reuse in every cell, where a handover delay will cause interference for other users in the same cell. Further, in the worst case, a delay in handover may cause the connection to be dropped, especially if the handover was made due to bad radio link quality.

Therefore, it is critical that an admission control request for handover be carried out very quickly. Since the processing of an admission control request is only one of many tasks performed during handover, the time to perform admission control should be a fraction of the time available for handover and may be on the order of 50 ms or less. This requirement will, of course, have a major influence on the architecture of resource management of the IP-based cellular access network.

The bandwidth broker performs the task of admission control for the packet switched (IP-based) transport network. It is believed that by introducing a bandwidth broker into the architecture, transmission costs can be saved by reducing the bandwidth margins while still maintaining quality of service.

Accordingly, there is a need to provide a scalable admission control process having a fast response time.

SUMMARY

In accordance with the present invention, a method of access control in a network is provided. The method includes the steps of determining a load status of at least two nodes in the network; determining whether the load status permits a specified quality of service; and if the specified quality of service is permitted, establishing a transport connection between the at least two nodes in the network. The step of determining a load status may include sending a probe packet through the network from a first node to a second node, and updating a portion of the probe packet at each node based on the load status of the node. The step of sending a probe packet through the network may be performed continuously, at pre-determined times, or in response to a network event. The network event may include the loss of a communication path or a threshold increase in network usage since the last probe packet was sent.

In accordance with another aspect of the present invention, a method of access control in a communication network is defined. The method includes the steps of determining a load status of the network between a call originating node and a call terminating node, determining whether the load status permits a specified quality of service, and if the specified quality of service is permitted, establishing a transport connection between the call originating node and the call terminating node.

In accordance with another aspect of the invention, there is an access control system in a network. The access control system includes at least one load measurement proxy, which probes the network to determine the congestion state of the network; a bandwidth broker server in communication with the at least one load measurement proxy and that correlates the determined congestion state information; and a bandwidth broker client in communication with the bandwidth broker server and an application, wherein the bandwidth broker client queries the bandwidth broker server based on requirements of the application. The requirements of the application include at least two node addresses and a quality of service. The requirements of the application may further include at least one of an application traffic class, a peak bit rate, a packet delay, a delay variation, a packet loss, and a guaranteed bit rate.

In accordance with yet another aspect of the invention, the load measurement proxy of the access control system probes the network continuously, at predefined intervals, or in response to a network event.

In accordance with still another aspect of the invention, there is an access control system in a network including at least one load measurement proxy, which probes the network to determine the congestion state of the network, and a bandwidth broker server in communication with the at least one load measurement proxy and correlating the determined congestion state information. A plurality of bandwidth broker clients are in communication with the bandwidth broker server and a respective one of a plurality of applications. Each of the plurality of bandwidth broker clients queries the bandwidth broker server based on requirements of the respective one of a plurality of applications.

It should be emphasized that the term "comprises" or "comprising," when used in this specification, is taken to specify the presence of stated features, integers, steps, or components, but does not preclude the presence or addition of one or more other features, integers, steps, components, or groups thereof.

BRIEF DESCRIPTION OF DRAWINGS

The objects and advantages of the invention will be understood by reading the following detailed description in conjunction with the drawings, in which.

DETAILED DESCRIPTION

The Bandwidth Broker (BB) was introduced in the IETF RFC 2638 as the logical entity in charge of resource management in a given administrative domain. According to the general definition, a bandwidth broker is responsible for resource allocation within that domain. Resource allocation may be accomplished by using protocols to communicate with other entities in the domain and by making admission decisions based on domain policies. The bandwidth broker may also communicate with neighboring bandwidth brokers for inter-domain resource management.

In the context of a GSM radio access network, a bandwidth broker may manage the IP-based transport resources used between the BTS and the BSC. As such, network management may be seen as an edge-to-edge resource management problem rather than an end-to-end problem. At call setup, or in the event of handover, the BSC asks the bandwidth broker about availability of transport resources for one or several paths, where each path is defined by two addresses in the radio access network. Once a request for resources has been accepted, packets can be transmitted on the path between the BTS and the BSC for that call. Policing and shaping at the edges (such as in the BTS) will ensure that the limits defined for a given QoS class are respected. However, in the event of unexpected events such as severe congestion or a link failure in the transport network, the bandwidth broker needs to be able to notify the BSC so that it may release previously established calls.

The current definition of Differentiated Services does not contain a simple, scalable solution to the problem of resource provisioning and control in the context of a cellular RAN. One solution, the load control scheme, has been proposed in a draft to the IETF, entitled "Load Control of Real-Time Traffic." The load control scheme is very simple and has good scaling properties. It was specifically designed to solve the edge-to-edge problem and does not purport to be a replacement for RSVP for end-to-end signaling. The Resource Reservation Protocol, or RSVP, is defined by RFC 2205. Load control typically operates edge-to-edge in a DS (DiffServ) domain, where only the edge devices monitor flow state and do per-flow processing.

Load control provides functionality for performing measurement-based admission control and detection of exceptional events such as link failures. By sending a specially marked packet, denoted a "probe" packet, along the path from the ingress to the egress edge device, the resource state of interior routers is gathered. At each hop in the network, the router will determine its congestion state for a particular DSCP and interface. If congestion is detected, the packet is marked accordingly (but never un-marked). As such, when the probe reaches the destination, it gives an aggregated view of the congestion state of the path. As a probe packet can be piggybacked in any IP packet, ordinary traffic packets may be used to carry out load control probing. The probe result is then used as input to the admission control function.

Figure 2:
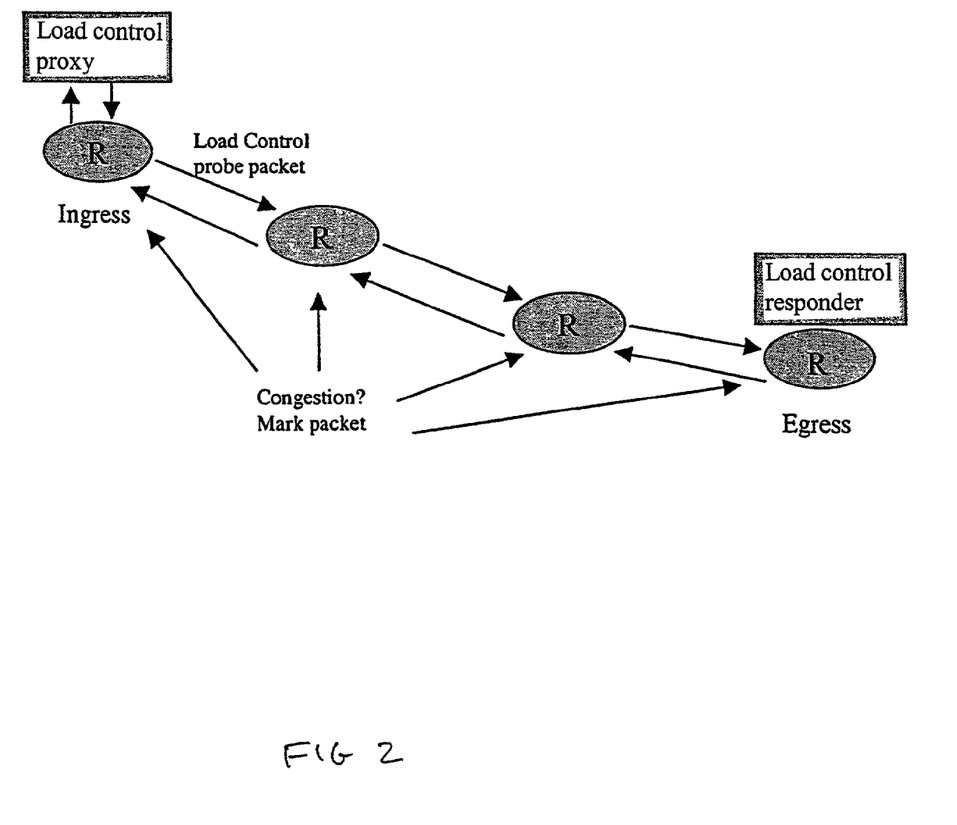
FIG. 2 is a block diagram of an embodiment of a measurement-based admission control process.

To determine the load status between an ingress and an egress edge device, the following steps are taken, as illustrated in FIG. 2. First, at the initiating ingress edge device, a load control proxy injects a load control probe packet into the network, addressed to the egress edge device. An ordinary traffic packet with payload can be used as a probe packet, but the header identifies the packet as having an additional purpose as a probe packet.

Next, the probe packet passes along the path to the destination, where interior routers measure their state, and, if they encounter near exhaustion of resources, they mark passing probe packets to indicate congestion. When the probe packet reaches the egress edge device, its header will reflect the aggregated resource status along that path. Finally, the egress device will then copy the status of incoming probe packets and may either send a report packet back to the ingress device or check for bidirectional resources by echoing the probe packet on the reverse path to the ingress device. When a probe or report packet is returned to the initiating ingress edge device, it uses the result of the probe for admission control and potentially other purposes.

Load control does not specify how an interior router decides whether to mark the packet, but one approach may be to use buffer measurements. Also, if an interior router does not implement load control, it simply treats the load control packet as an ordinary packet, which will mean that the packet is left untouched and is forwarded to the destination. In this way, there may be over-provisioned segments within the network.

The DSCP (DiffServ codepoint) of the probe packet is used to indicate the DiffServ class for which a measurement is done and thus the QoS requirements. In this way, load control can be used to measure the load for any path and QoS class. By using the DSCP, real-time traffic can be further divided into classes based on resource requirements. Further, the DSCP may denote not only the PHB, but implicitly also the bandwidth requirements for a specific class.

Figure 3:
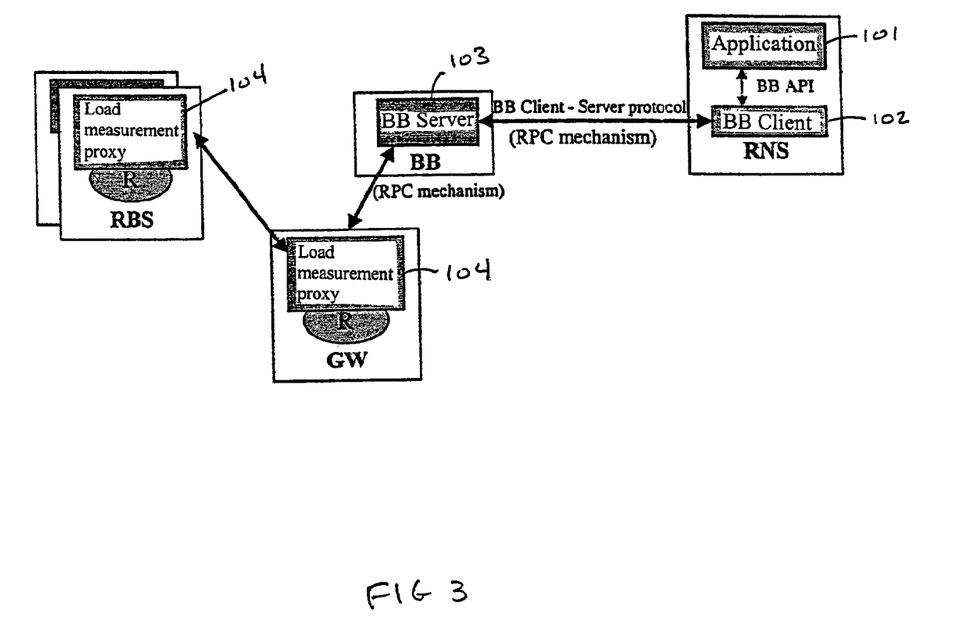
FIG. 3 is a block diagram of the bandwidth broker.

FIG. 3 depicts a high-level view of the bandwidth broker. The application 101 inquires whether a particular path is congested. This inquiry is sent from the application 101 to the bandwidth broker client 102 over an application programming interface (API). The bandwidth broker client 102 takes this inquiry and formulates an API call to the bandwidth broker server 103 with the appropriate parameters. These parameters may include, for example, the address of a destination node and the desired QoS. The bandwidth broker server 103 collects information from various load measurement proxies 104 located at various points in the network. This information is used to determine the congestion state of various paths through the network. As can be appreciated, the bandwidth broker may make decisions based upon cached information rather than re-compiling network status information from the load measurement proxies each time an application makes an inquiry. Thus, the bandwidth broker's information may not always reflect the real-time state of the network.

Figure 4:
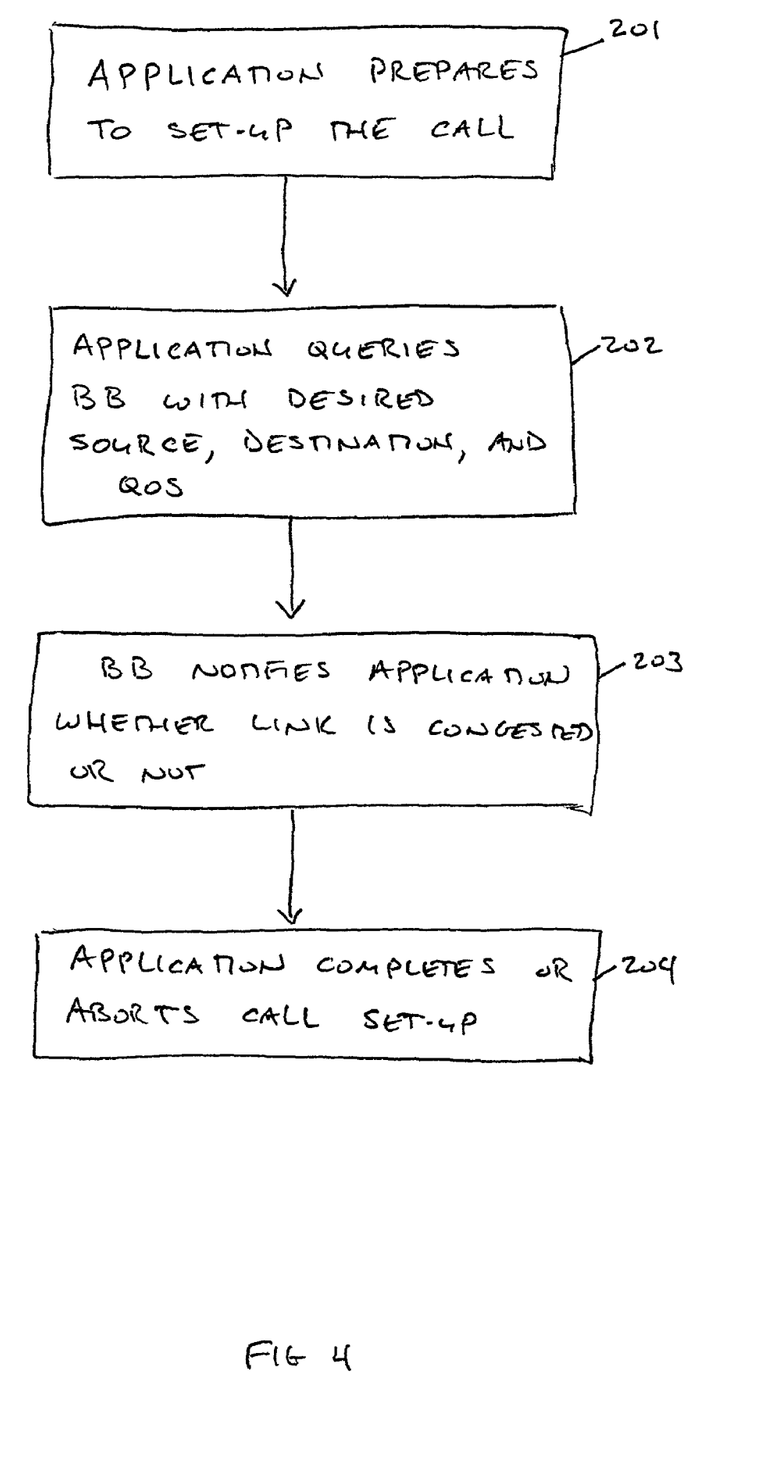
FIG. 4 is a flow diagram of the call admission process.

FIG. 4 depicts the steps that may be taken to determine whether to admit a call. As can be appreciated, the term "call" is used as a generic term for an application-specific on-demand related event that requires a transport network resource. A typical "call" for a radio access network in GSM may be a radio connection that needs a path from a gateway node to the base station.

In step 201, the appropriate application-level signaling takes place to prepare to set up the call. At the appropriate time, the application asks the bandwidth broker whether a call from an ingress point to an egress point using a particular class of service can be admitted (step 202). The bandwidth broker may map the QoS requested by the application to the appropriate DiffServ traffic class of the DiffServ domain. As can be appreciated, the QoS demand of the application may be specified using one or more of the following parameters: application traffic class, peak bit rate, packet delay, delay variation, packet loss, and guaranteed bit rate. The application traffic class may be defined as conversational, streaming, interactive, or background. As one would expect, a conversational traffic class would demand the highest QoS and a background traffic class would require a lower QoS. The application traffic class may be mapped to a DiffServ traffic class (also known as Per-Hop Behavior), as shown in Table 1.

TABLE 1

Typical mapping between application traffic class and DiffServ traffic class

| Application Traffic Class | DiffServ Traffic Class |
| --- | --- |
| conversational | Expedited Forwarding |
| streaming | Assured Forwarding 1 |
| interactive | Assured Forwarding 2 |
| background | Best Effort |

The bandwidth broker looks up those two endpoints and the traffic class, and notifies the application whether that desired link is currently congested or not (step 203). Depending on the result of the inquiry, the application either completes or aborts the call setup. In the meantime, the load measurement proxy is probing the network to determine the congestion state for each pair of endpoints and also for various traffic classes. The pictures of the network that the proxies build are compiled by the bandwidth broker to be used as the basis for the decision taken in step 203 above. As can be appreciated, the load measurement proxy continues to probe the network to determine the congestion state of the network. This may be accomplished as a background process and may be done continuously, at predetermined times, or in response to particular network events.

The bandwidth broker may be employed in a variety of types of networks. For example, the bandwidth broker may be used in a radio access network having IP-based transport between network nodes. This type of network architecture is commonly referred to as a transport network architecture. FIG. 4 is an exemplary embodiment of a transport network architecture. Generally speaking, the IP-based transport network is divided into domains. In one domain, the aggregation domain (or lower RAN), the traffic for a number of RBSs is aggregated together, and the bandwidth is reserved on-demand per radio link. In another domain, the trunk domain (or upper RAN), a number of "trunks" are semi-statically allocated between nodes.

Figure 5:
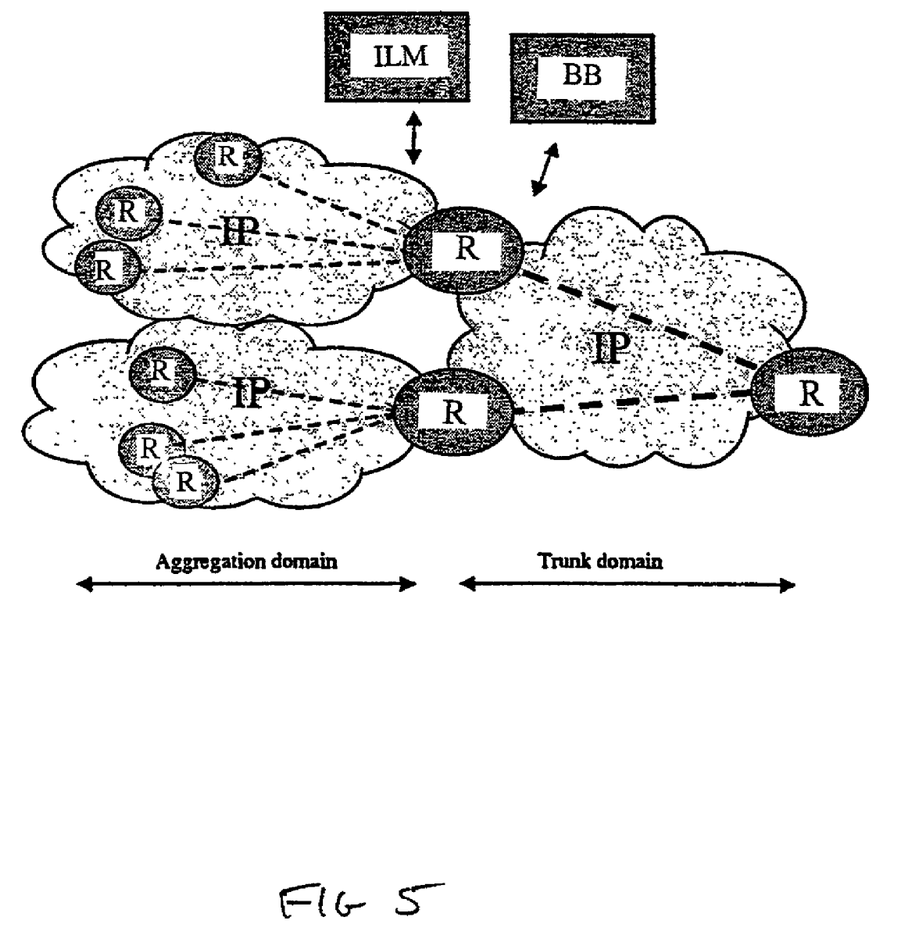
FIG. 5 is an exemplary embodiment of a transport network architecture.

As shown in FIG. 5, the transport network architecture may include several components. The IP router (R) is known to the art, and may have different functionality depending on whether it is an edge router, a core router, or an aggregation router. This varying functionality is not unique to the bandwidth broker application. The IP layer manager (ILM) controls the configuration management, fault management, and performance management of the IP-based transport network. Finally, there is a bandwidth broker (BB).

As can be appreciated, the bandwidth broker may only be aware of the nodes at the edges of the transport network. That is, from the bandwidth broker's point of view, the transport network is a "black box" with paths between endpoints. The bandwidth broker may also be implemented to have a complete understanding of the IP network topology. Thus, the degree to which the bandwidth broker is aware of the network topology may be chosen by the network management operator.

Figure 6:
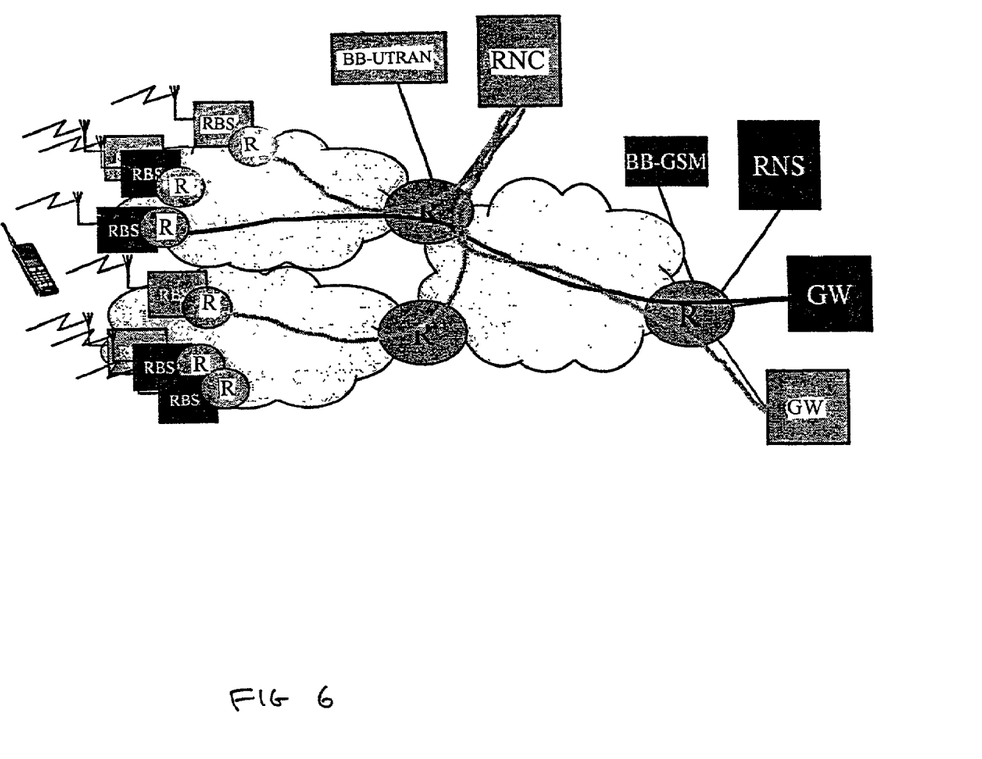
FIG. 6 is a block diagram of a IP-based radio access network.

The transport network architecture may be applied to various bandwidth broker applications, including IP-based radio access networks, as shown in FIG. 6. Examples of such networks are GSM and UTRAN (Universal Mobile Telecommunications System Terrestrial Radio Access Network) mobile networks.

In GSM, the Radio Network Server (RNS) controls the radio resources for a part of the radio network (a number of "cells"), which includes the control of the radio connections. The RNS may ask the BB if a call and its related resources can be admitted into the network.

The Radio Network Controller (RNC) is responsible for radio resource management for the UTRAN application, and also performs some user data processing. Accordingly, the node is one of the endpoints for on-demand user data paths. In a UTRAN network, the RNC may ask the BB for resources.

The Gateway (GW) provides, among other things, the capability for converting between circuit-switched transport and IP-based transport. The location and exact functionality of this node conventionally known to the art. The GW router is one of the endpoints in the path for which resources may be requested.

The Radio Base Station (RBS) provides the capability for radio transmission, radio reception, and related functions. An RBS belongs to either GSM or the UTRAN application. The router in the RBS is one of the endpoints in the path for which resources are requested.

In GSM networks, the BSC may be functionally divided into two nodes. One node would perform the tasks of the RNS and the other would perform the tasks of the GW. The RNS may contain the logic for radio resource control, such as handover and establishment of connections for calls. The GW may contain the equipment for processing user data packets, including a termination of the circuit-based legacy transmission toward the core network nodes.

Generally speaking, the same transport network resources may be shared by several independent applications (like UTRAN and GSM) and also several application nodes may ask for the same transport network resources. Thus, a combined network topology such as that shown in FIG. 6 may exist. In this case, each application may have its own independent bandwidth broker, and each router would be responsible for dividing the available resources as necessary. One benefit of having independent bandwidth brokers is that the implementation of the bandwidth broker may be simplified by minimizing the need for coordination between bandwidth brokers to perform the execution of an admission control request. In addition, each application node may perform probing independently of the other applications.

Because a short response time is desired, the bandwidth broker should be located as close as possible to the application node. Generally speaking, each application node should have its own independent bandwidth broker, but the routers would conduct load control polling on behalf of all application and divide the bandwidth between the various applications.

For GSM, the on-demand user data paths are typically between an RBS and a GW. Each GW may have paths to many RBSs, but each RBS may have a path to just one GW. The RNS is typically located near the GW and since the bandwidth broker should be located as near as possible to the application (i.e., the RNS), the BB should be located near the GW as well.

For UTRAN, the situation in somewhat different, since the path is divided into two parts, with the RNC in the middle. From the GW there may be a path to the RNC. The path is then split into several paths to each RBS. Typically, the bandwidth broker is located near the RNC.

Figure 7:
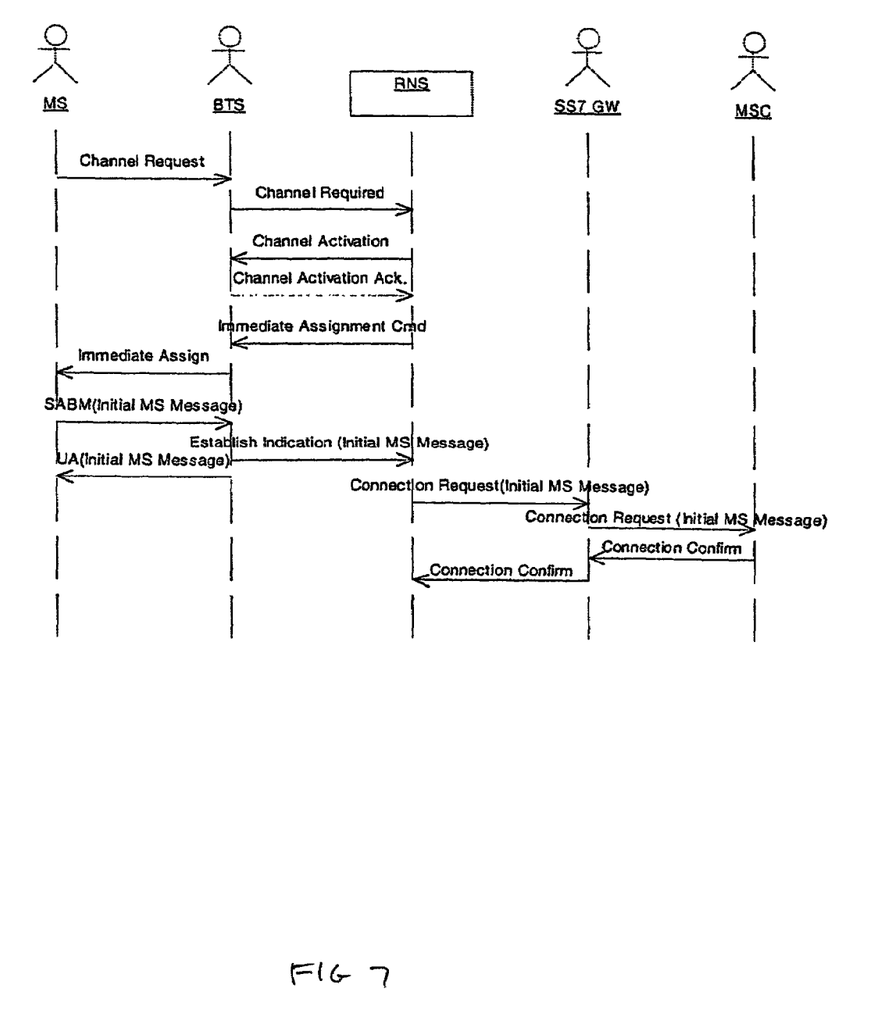
FIG. 7 is a signal diagram of the GSM connection setup procedure.

FIG. 7 depicts the conventional call set-up signaling for GSM. The mobile station (MS) sends a channel request to the BTS. The BTS, in turn, notifies the RNS that a channel is required. If a channel is available, the RNS responds by sending a channel activation message to the BTS, which the BTS acknowledges. The BTS then assigns the channel to the MS and the MS establishes a signaling connection with the MSC.

Figure 8:
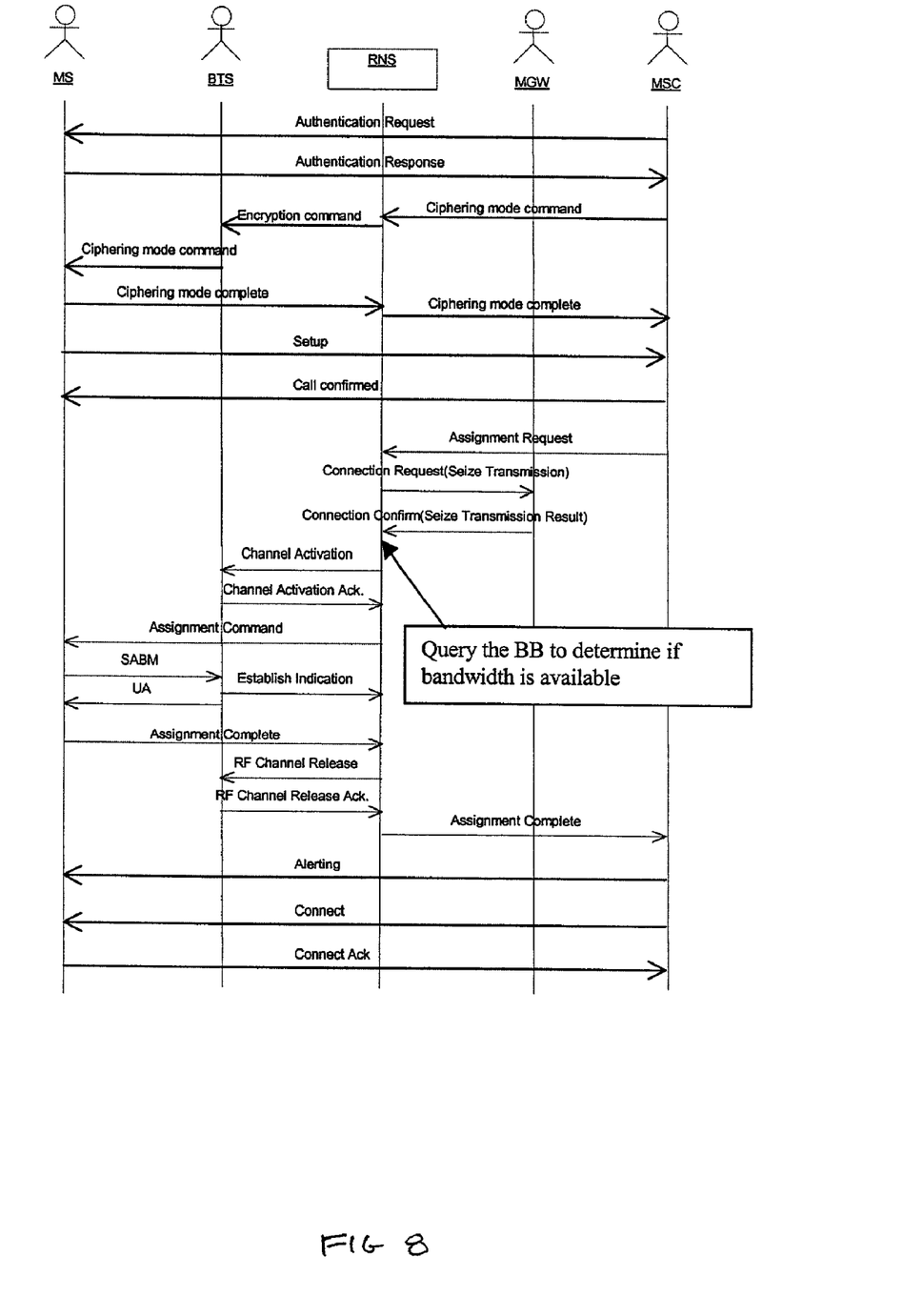
FIG. 8 is a signal diagram of the GSM traffic channel setup procedure.

At no point during the signaling connection setup procedure is the BB involved, since the control plane signaling connection uses a common transport resource in GSM. It is when the traffic channel (e.g., for speech) is established that the BB is queried. For example, as shown in FIG. 8, when the MS wishes to establish a connection, the MS and MSC communicate over the signaling channel. These messages are transparent to the RAN. Once the bearer capabilities have been established between the MS and MSC, the MSC begins the process of establishing a traffic channel by sending an assignment request message to the RNS. The RNS responds to the assignment request by sending a connection request to the MGW, which the MGW confirms. Upon receiving confirmation from the MGW, the RNS queries the BB to determine if bandwidth is available that satisfies the parameters requested by the MS. If the bandwidth is available, the traffic channel is established. If the bandwidth is not available, then the traffic channel establishment procedure ends.

It is at this point that the RNS understands the kind of service requested, as well as the two endpoints for the conversation. Those two endpoints are the IP address and port in the RIBS and the IP address and port in the GW. The first pair is sent to the GW in the connection request and the latter pair is sent to the RBS in the channel activation but is known to the RNS after the connection confirm from the GW to the RNS.

We have described an architecture for resource management of transport resources in IP-based cellular radio access networks. The architecture enables a very short response time for admission control requests. This means that handover can be performed very quickly, since the delay added by admission control for the IP transport resources is minimal. Nonetheless, the admission control result is believed to be reasonably accurate.

The invention has now been described generally and with respect to a radio access network. In light of this disclosure, those skilled in the art will likely make alternate embodiments of this invention. For example, to determine the load status between an ingress and an egress edge device, the load control proxy could ping the edge devices rather than injecting a load control probe packet into the network. The transit times to edge devices could be determined and the network congestion estimated. These and other alternate embodiments are intended to fall within the scope of the claims which follow.

What is claimed is:

1. An access control system in a network comprising:
   at least one load measurement proxy, which probes the network to determine the congestion state of the network;
   a bandwidth broker server in communication with the at least one load measurement proxy and correlating the determined congestion state information; and
   a bandwidth broker client in communication with the bandwidth broker server and an application, wherein the bandwidth broker client queries the bandwidth broker server based on requirements of the application.

2. The access control system of claim 1, wherein the requirements of the application include at least two node addresses and a quality of service.

3. The access control system of claim 1, wherein the requirements of the application include at least one of an application traffic class, a peak bit rate, a packet delay, a delay variation, a packet loss, and a guaranteed bit rate.

4. The access control system of claim 1, wherein the load measurement proxy continuously probes the network.

5. The access control system of claim 1, wherein the load measurement proxy probes the network at predefined intervals.

6. The access control system of claim 1, wherein the load measurement proxy probes the network in response to a network event.

7. The access control system of claim 1, wherein the load measurement proxy determines the congestion state of the network for each of a plurality of traffic classes.

8. An access control system in a network comprising:
   at least one load measurement proxy, which probes the network to determine the congestion state of the network,
   a bandwidth broker server in communication with the at least one load measurement proxy and correlating the determined congestion state information; and
   a plurality of bandwidth broker clients in communication with the bandwidth broker server and a respective one of a plurality of applications, wherein each of the plurality of bandwidth broker clients queries the bandwidth broker server based on requirements of the respective one of a plurality of applications.

9. A method of access control in a network comprising:
   probing the network to determine the congestion state of the network using at least one load measurement proxy;
   correlating the determined congestion state information using a bandwidth broker server in communication with the at least one load measurement proxy; and
   querying the bandwidth broker server based on requirements of an application using a bandwidth broker client in communication with the bandwidth broker server and the application.

10. The method of claim 9, wherein the requirements of the application include at least two node addresses and a quality of service.

11. The method of claim 9, wherein the requirements of the application include at least one of an application traffic class, a peak bit rate, a packet delay, a delay variation, a packet loss, and a guaranteed bit rate.

12. The method of claim 9, comprising continuously probing the network using the load measurement proxy.

13. The method of claim 9, comprising probing the network at predefined intervals using the load measurement proxy.

14. The method of claim 9, comprising probing the network in response to a network event using the load measurement proxy.

15. The method of claim 9, comprising determining the congestion state of the network for each of a plurality of traffic classes using the load measurement proxy.

* * * * *